(12) United States Patent
Fahs, II

(10) Patent No.: US 10,745,304 B2
(45) Date of Patent: *Aug. 18, 2020

(54) METHOD AND SYSTEM FOR TREATING MATERIAL WITH LIGHT

(71) Applicant: Fahs Stagemyer LLC, Woodstock, CT (US)

(72) Inventor: Richard W. Fahs, II, Woodstock, CT (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/876,177

(22) Filed: Jan. 21, 2018

(65) Prior Publication Data

US 2018/0334399 A1    Nov. 22, 2018

Related U.S. Application Data

(63) Continuation of application No. 13/775,773, filed on Feb. 25, 2013, now Pat. No. 10,287,193, which is a
(Continued)

(51) Int. Cl.
| | |
|---|---|
| *C02F 1/72* | (2006.01) |
| *C02F 1/30* | (2006.01) |
| *C02F 1/00* | (2006.01) |
| *C02F 1/32* | (2006.01) |
| *C02F 1/36* | (2006.01) |

(Continued)

(52) U.S. Cl.
CPC .............. *C02F 1/725* (2013.01); *C02F 1/001* (2013.01); *C02F 1/30* (2013.01); *C02F 1/325* (2013.01); *C02F 1/36* (2013.01); *C02F 1/004* (2013.01); *C02F 2101/16* (2013.01); *C02F 2103/008* (2013.01); *C02F 2201/322* (2013.01); *C02F 2201/326* (2013.01); *C02F 2201/3226* (2013.01); *C02F 2303/04* (2013.01); *C02F 2305/10* (2013.01)

(58) Field of Classification Search
CPC .......... B01D 15/00; C02F 1/36; C02F 1/4608; C02F 1/46109; C02F 1/48; C02F 1/30; C02F 1/32; C02F 1/725; C02F 1/001; C02F 1/325; C02F 1/004; C02F 2101/16; C02F 2103/008; C02F 2201/322; C02F 2201/3226; C02F 2201/326
USPC ....... 210/748, 748.01, 251, 542, 257.1, 153, 210/243, 600
See application file for complete search history.

(56) References Cited

U.S. PATENT DOCUMENTS

2003/0217978 A1*  11/2003  Safta ....................... C02F 1/325
                                                                210/202

* cited by examiner

*Primary Examiner* — Robert Clemente
*Assistant Examiner* — Akash K Varma

(57) ABSTRACT

Internally activated energy distribution guides for use in clear to turbid liquids or air have been developed. An external energy source is transferred to a matrix or single fiber of a side emitting fiber or guide to internally activate a promoter or catalyst on the exterior of the fiber or guide to thereby dissociate target molecules passing by or along the fiber's or guide's surface by a Precise Energy Separation ("PES") method. A number of different designs can be used, for example, in a mesh, louver system, or box. The method maximizes the interaction between the target molecules and the surface of the side emitting—internally activated distribution network. In a preferred embodiment, u-shaped fiber optics containing catalyst are positioned within tube through which the turbid liquid or air is passed, so that maximum cleavage of targeted bonds is obtained.

20 Claims, 4 Drawing Sheets

Related U.S. Application Data continuation-in-part of application No. 13/404,929, filed on Feb. 24, 2012, now Pat. No. 9,073,766, which is a continuation-in-part of application No. 12/861,524, filed on Aug. 23, 2010, now Pat. No. 8,202,500.

(60) Provisional application No. 61/715,640, filed on Oct. 18, 2012, provisional application No. 61/315,262, filed on Mar. 18, 2010, provisional application No. 61/306,281, filed on Feb. 19, 2010, provisional application No. 61/236,592, filed on Aug. 25, 2009.

(51) Int. Cl.
*C02F 101/16* (2006.01)
*C02F 103/00* (2006.01)

METHOD AND SYSTEM FOR TREATING MATERIAL WITH LIGHT

CROSS REFERENCE TO RELATED APPLICATIONS

This application is a continuation of U.S. patent application Ser. No. 13/775,773 filed Feb. 25, 2013 in the name of Richard W. Fahs II and Matthew D. W. Fahs and entitled "Systems and Methods for the Treatment of Ballast Water;" which claims priority to U.S. Provisional Application No. 61/715,640, filed Oct. 18, 2012 in the name of Richard W. Fahs and entitled "Tunable Side-Emitting Fiber Optic Devices for Precise Energy Generation and/or Distribution;" and which is a continuation-in-part of U.S. patent application Ser. No. 13/404,929, filed Feb. 24, 2012 in the name of Richard W. Fahs II and Matthew D. W. Fahs and entitled "Methods for the Treatment of Ballast Water," now U.S. Pat. No. 9,073,766;" which is a continuation-in-part of U.S. patent application Ser. No. 12/861,524, filed Aug. 23, 2010 in the name of Richard W. Fahs II and Matthew D. W. Fahs and entitled "Processes and Uses of Dissociating Molecules," now U.S. Pat. No. 8,202,500;" which claims priority to: U.S. Provisional Application No. 61/236,592 filed Aug. 25, 2009; U.S. Provisional Application No. 61/306,281 filed Feb. 19, 2010; and U.S. Provisional Application No. 61/315,262 filed Mar. 18, 2010. Each of the above-identified priority applications is hereby incorporated herein by reference. This application is further related to: U.S. patent application Ser. No. 13/524,950 filed Jun. 15, 2012, now U.S. Pat. No. 8,440,154, which is a continuation of U.S. patent application Ser. No. 12/861,524; U.S. patent application Ser. No. 14/790,506 filed Jul. 2, 2015, now U.S. Pat. No. 9,334,183, which is a continuation of U.S. patent application Ser. No. 13/404,929; and U.S. patent application Ser. No. 14/057,997 filed Oct. 18, 2013.

FIELD OF THE INVENTION

The present invention is related to treating material with light, for example in connection with the design and applications of side-emitting optical fibers and guides such as waveguide, energy guides and frequency guides for the generation and/or distribution of tunable and well-defined packets or pulses of energy.

BACKGROUND OF THE INVENTION

There is a need for improved side emitting fiber optic devices that can emit very precise singular or multiple monochromic or range of wavelengths, or frequencies at a high intensity, sufficient to cleave specific bonds under conditions such as turbid water. It is also important in some applications to have feedback, so that when the light is used to dissociate molecules into components, the light is tunable to increase the intensity, the wavelength bandwidth, the number of monochromic wavelengths or frequencies, set duration of exposure and/or cease operation. Unlike most conventional applications, it is extremely difficult to penetrate obscure conditions such as turbid water, much less with precise wavelengths.

Therefore, it is an object of the invention to provide improved side emitting fiber optic devices that can emit a very precise wavelength or frequency at a high intensity.

It is another object of the present invention to provide side-emitting fiber optic devices that are responsive, so that when the light is used to dissociate molecules into components, the light is tunable to increase the intensity, the wavelength bandwidth, the number of monochromic wavelengths or frequencies, set duration of exposure and/or cease operation.

SUMMARY OF THE INVENTION

Internally activated energy distribution guides for use in clear to turbid liquids or air have been developed. An external energy source is transferred to a matrix or single fiber of a side emitting fiber or guide to internally activate a promoter or catalyst on the exterior of the fiber or guide to thereby dissociate target molecules passing by or along the fiber's or guide's surface by a Precise Energy Separation ("PES") method. The promoter or catalyst is present in an effective amount to boost the energy at a selected wavelength(s) to cleave one or more targeted bonds in the material in the turbid liquid or air.

A number of different designs can be used, for example, in a mesh, louver system, or box. The method maximizes the interaction between the target molecules and the surface of the side emitting—internally activated distribution network. In a preferred embodiment, u-shaped fiber optics containing catalyst are positioned within tube through which the turbid liquid or air is passed, so that maximum cleavage of targeted bonds is obtained.

BRIEF DESCRIPTION OF THE DRAWINGS

FIG. 1A is a schematic of deposition of catalyst within a single tube fiber optical fiber, FIG. 1B. As shown in FIGS. 1A and 1B, the fiber optic is turned on a lathe while gas, such as $SiCl_4$, $POCL_3$, $GeCl_4$, or $BBr_3$ is deposited on the outer wall of the inner lumen of the fiber optic tube to form a catalyst.

DETAILED DESCRIPTION OF THE INVENTION

Definitions and Mechanisms

Figures 1A, 1B:
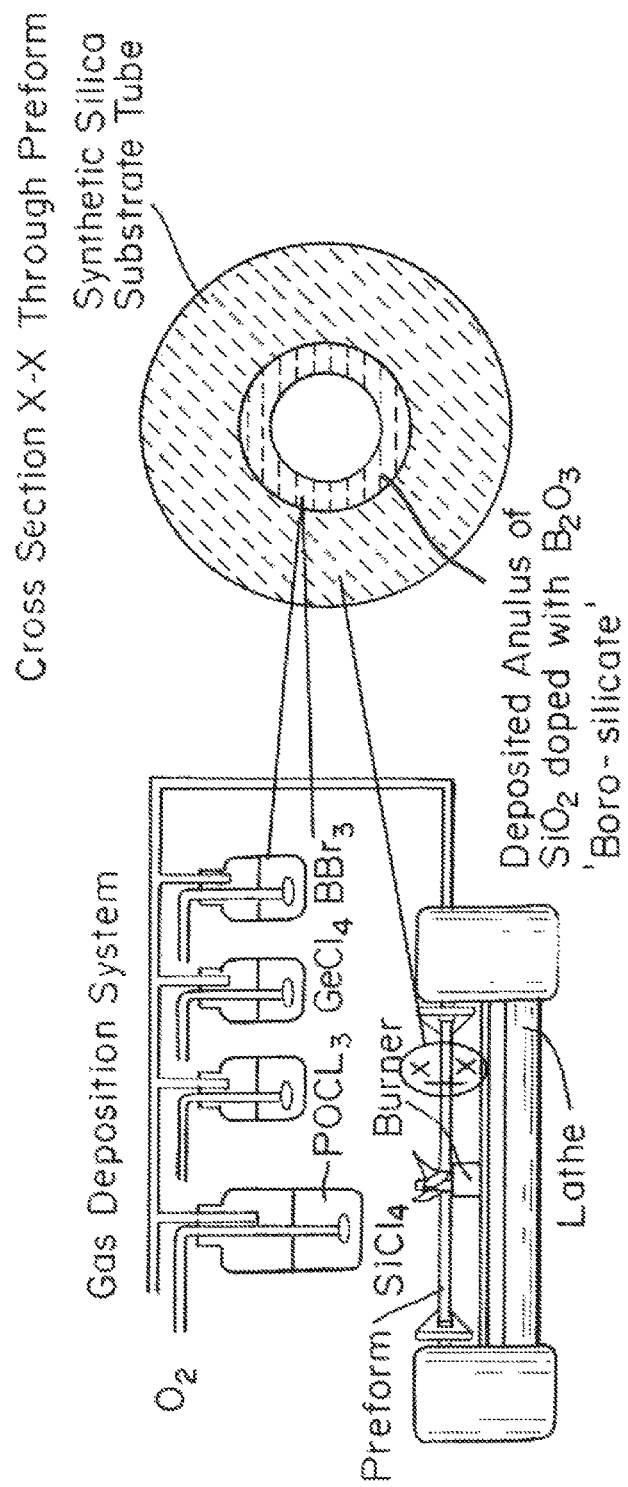

The terms "fiber optic" and "optical fiber", as used interchangeably herein, refer to a long narrow filament of transparent or semi-transparent dielectric material, usually circular in cross section, that guides light. As used herein, this includes a single optical fiber (FIGS. 1A, 1B) or a bundle (FIG. 2) of optical fibers joined together to form a larger strand or optical cable. The fiber typically contains a central core region of low dielectric constant surrounding by an outer cladding layer with higher dielectric constant. The optical cable may further contain one or more stabilizing materials to provide support. A single optical fiber is typically axially symmetric. An example is a multilayer dielectric photonic band-gap structure that exhibits omnidirectional reflectivity.

The "waveguide, energy guide or frequency guide" is a structure which guides waves, such as electromagnetic waves, sound waves, or frequencies or energies. There are different types of waveguides for each type of wave, energy or frequency. Waveguides differ in their geometry which can confine energy in one dimension such as in slab waveguides or two dimensions as in fiber or channel waveguides. Different waveguides are needed to guide different frequencies: an optical fiber guiding light (high frequency) will not guide microwaves (which have a much lower frequency). As a rule of thumb, the width of a waveguide needs to be of the same order of magnitude as the wavelength of the guided wave.

The "longitudinal axis" of an optical fiber, as used herein, refers to the long axis of the fiber. This is the direction of propagation of light when operating under total internal reflection.

The "normal" of an optical fiber, as used herein, is the direction perpendicular to the longitudinal axis of the fiber.

The "acceptance angle", as used herein, refers to the angle over which the core of an optical fiber accepts incoming light measured with respect to the longitudinal axis.

The "end of the fiber optic", as used herein, means the area of the fiber optic near the light receiving portion of the optical fiber which may include supporting material, adapters, amplifiers, multiplexers, sheaths and lenses The term "single mode optical fiber", as used herein refers to an optical fiber in which only the lowest order bound mode, such as a pair of orthogonally polarized fields, can propagate in a sustained manner at a wavelength of interest. Crystal optical fibers, which can contain multiple modes, are considered single mode optical fibers as they carry a single mode over a propagation distance. While single mode optical fibers typically waveguide and transmit exactly one transverse mode at a specific wavelength, they may transmit many longitudinal modes, such as the modes output by a multimode longitudinal laser.

The term "optical fiber core", as used herein, may include any material or materials that provides for the propagation and/or dispersion of an optical signal within the fiber. In the case where the optical fiber is an optical cable as defined above, the core of the cable includes each of the enclosed optical fibers as well as any support or encasing materials and each of the contained fibers within the cable will additionally contain a distinctly identifiable core. The term "optical fiber cladding", as used herein, refers to a layer of glass or other transparent or semi-transparent material that may be surrounding the light-carrying core of an optical fiber. It typically has a lower refractive index than the core and thus confines light in the core.

The term "optical fiber coating," as used herein, refers to a protective or supportive layer optionally applied to the exterior of the optical fiber cladding or optical fiber core if no cladding material is present. The optical fiber coating need not cover the entire length of the optical fiber.

The term "numerical aperture", as used herein, is a measure of the difference in the refractive index of the optical fiber core, $n_{core}$, and the optical fiber cladding, $n_{clad}$, defined by the formula:

$$\sqrt{n_{core}^2 - n_{clad}^2}.$$

The term "optical connector" or "connector", as used interchangeably herein, refers to a device mounted on the end of an optical fiber, optical cable, light source, receiver, or housing that mates to a similar device to couple light into and out of optical fibers. A connector joins two fiber ends, or one fiber end and a light source or detector.

Figure 3:
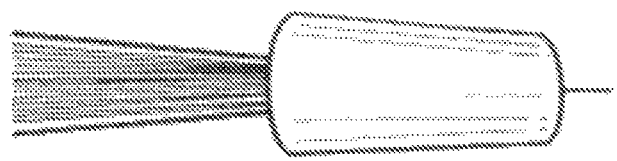
FIG. 3 is a perspective view of a funnel combiner of fiber optical devices.
Figure 4:
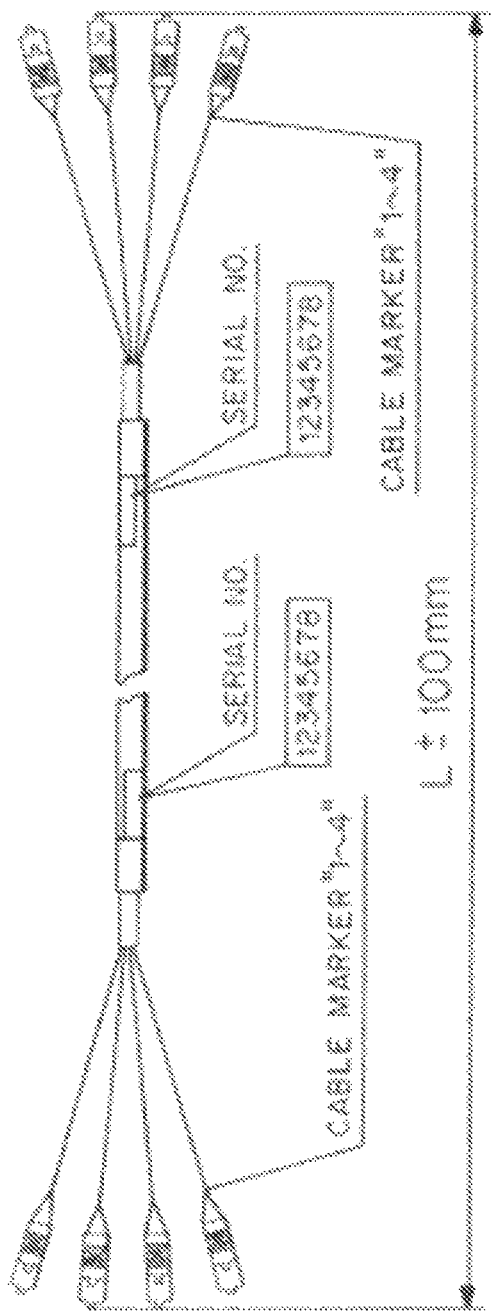
FIG. 4 is a perspective view of several source arrays with distribution optic cable to several end point destinations.

The term "optical coupler", as used herein, refers to a device that connects three or more fiber ends, dividing one input between two or more outputs or combining two or more inputs into one output. See FIGS. 2 and 3. The term "concatenation", as used herein, refers to any method of coupling the light receiving ends of two or more optical fibers. The concatenation can be accomplished in any manner that results in light emitted from the end of one or more optical fibers entering within the acceptance angle into the end of one or more different optical fibers. Concatenation may employ any devices or means necessary, including but not limited to optical fiber connectors, lenses, mirrors, or optical couplers. The concatenation may further optionally include one or more amplification devices. See FIG. 4.

The terms "evanescent wave" and "evanescent mode", as used interchangeably herein, refer to light waves that extend beyond the boundary of a fiber core into the cladding. Evanescent waves can transfer energy between optical fibers or from an optical fiber to a coating material or to a species on the surface of the optical fiber.

The terms "cladding wave" and "cladding mode", as used interchangeably herein, refer to light waves or modes that are carried primarily in the cladding of the optical fiber.

"Dissociation" as generally used herein refers to the breaking of one or more of the bonds of a molecule. Dissociation in the current process requires that the original bonds of the target molecule do not re-associate.

"Excited state" as used herein refers to a state in which one or more electrons of an atom or molecule are in a higher-energy level than ground state.

"Non-target molecule" as used herein refers to the any substance within a sample containing target molecules which is not affected by the process.

"Promoter" as used herein refers to the energy required for dissociation of a target bond, which is both selective for the target bond and sufficient to prevent re-association of the bond.

"Energy of dissociation source" as used herein refers to any chemical, apparatus, or combination thereof, which supplies the energy of dissociation with the energy required to dissociate target bonds within a target molecule. The energy of dissociation source must supply suitable intensity and suitable frequency for target bond dissociation. An example of an energy of dissociation source is an xenon lamp coupled to a pulse generator. An energy of dissociation source can optionally contain a catalyst. An example of such an energy of dissociation source is a titanium dioxide catalyst and an xenon lamp coupled to a pulse generator.

"Target molecule," as used herein, refers to a molecule, or portion of a macromolecule, that contains at least one bond, which is subjected to precise energy dissociation. A target molecule can be an assembly of molecules, a nanoparticle, microparticle, cell, virus, tissue or portion thereof.

"Target bond," as used herein, refers to any bond within a target molecule. Target bonds can be covalent, ionic, or "weak bonds" including dipole-dipole interactions, London dispersion forces, or hydrogen bonding. Target bonds can be single or multiple covalent bonds.

"Irradiation" as generally used herein refers to subjecting or treating a sample with beams of particles, photons, or energy. Irradiation includes any form of electromagnetic or acoustic radiation.

"Bond dissociation energy" as generally used herein refers to the standard enthalpy of change when a bond is cleaved.

"Bond energy" as generally used herein refers to the average of the sum of the bond dissociation energies in a molecule.

"Component products" as generally used herein refers to known ions or atoms composed of only elements found within the target molecule. Individual component products have a chemical formula distinct from the target molecule. An example is $N_2$ and $H_2$, which are each component products of $NH_3$.

The term "side-emitting fiber optic device", as used herein, refers to an optical fiber and any associated supports, supporting materials, light or energy sources, protective materials, and/or protective coatings wherein the optical fiber emits in a direction sufficiently perpendicular to the longitudinal axis a particular wavelength or wavelengths of light to dissociate one or more target bonds in one or more target molecules. In certain applications, the side emission may be understood to include the evanescent wave formed at the boundary of the optical fiber core. In certain embodiments, the side emission may occur only at certain discreet regions along the longitudinal axis of the fiber.

The term "attenuation" refers to the loss of signal or light intensity as a mode propagates along the fiber. It is typically quantified in decibels (db) based upon the ratio of intensities of the input and output signals or, more preferably in optical fibers, in units of db per unit of fiber length (ie. db/km is a common unit in the telecommunications industry). Attenuation can be understood to arise from many factors, including but certainly not limited to scattering of the light wave (both back scattering along the longitudinal axis as well as side scattering effects) or absorption typically resulting in heating of the core or cladding materials. The term "attenuation", as used herein, may also refer only to the portion of light input that is emitted from the side of the optical fiber. The attenuation is typically reported in units of decibels per unit length of the fiber and with reference to the input intensity.

A single optical fiber may comprise two or more layers of one or more different materials. Conventional optical fibers comprise two transparent or semi-transparent materials, consisting of a core material with a higher index of refraction and an outer coating material with a lower index of refraction. In some embodiments the single optical fibers consist of three or more layers. In some embodiments these are 1-dimensional photonic crystals. See FIG. 1B.

Preferred fiber optics are fused silica fibers having thin reflective cladding layers, which promote longitudinal propagation of laser light. Typically, a single optical fiber has a diameter ranging between 0.5 and 1.5 mm. In some embodiments the optical fibers are "nano fibers". In certain embodiments optical nano fibers have a diameter less than 10,000 nm, preferably less than 1,000 nm, more preferably less than 100 nm.

The term "dispersion shifted fiber" or "dispersion shifted optical fiber," as used herein, refers to a type of single-mode optical fiber often used in high-bit-rate, long-distance telecommunications systems. Silica-clad dispersion fiber usually has a segmented core that lowers the slope of the dispersion curve at 1550 nm, the wavelength at which silica-based glasses typically reach their lowest attenuation. That is, dispersion shifted optical fiber may exhibit minimal or zero dispersion in a 1550 nm window of propagation that also provides minimal or controlled attenuation.

The term "dispersion" or "chromatic dispersion," as used herein, refers to a property of a material or an optical path to separate light transmitting there through into its constituent wavelength components or colors. In an optical fiber, dispersion reduces bandwidth or data carrying capacity as different wavelengths of light travel at different speeds through the optical fiber communication medium. An optical signal, such as an optical pulse, that is composed of multiple colors or wavelengths of light spreads during propagation according to 45 the dispersion properties of the optical fiber and the wavelength spread of the signal. Measuring time delay of an optical pulse as a function of wavelength can yield a dispersion characterization of an optical fiber.

The term "group delay," as used herein, refers to an optical property mathematically related to dispersion. Pulses at various wavelengths may propagate at different speeds in an optical fiber and thus experience wavelength dependent propagation delay over a unit length of the optical fiber. Group delay of an optical fiber can be measured by determining the transit times of optical signals, having unique wavelengths, traveling a given distance in the fiber. Whereas dispersion is typically measured in picoseconds per nanometer ("ps/nm"), group delay is typically measured in the units of picoseconds ("ps"). Dispersion is usually characterized as the 60 derivative or slope, with respect to nanometers or another expression of wavelength, of an optical fiber's group delay. That is, dispersion can be the change in group delay with respect to wavelength.

The term "interference," as used herein in the context of manipulating light by interference, refers to an additive or subtractive process whereby the amplitudes of two or more overlapping light waves are systematically attenuated and reinforced via interaction with one another. Interference can produce phase shifts, wavelength selective reflection, or broadband transmission, to name a few examples.

The term "interference filter," as used herein, refers to an optical filter that controls the spectral composition of transmitted or reflected photonic energy at least partially by the effects of interference. An interference filter can be made up of thin layers of metal or dielectric material, resulting in high transmission over one or more narrow spectral bands and high reflection outside such bands. The term "Bragg grating", as used herein, refers to a filter that separates light into constituent colors in accordance with Bragg's law. A fiber Bragg grating is a Bragg grating imposed in an optical waveguide, typically an undulated or periodic refractive index that interacts with light transmitting in the waveguide. The optical waveguide can be an optical fiber, a planar lightguide circuit, or a laser gain medium, for example. That is, the waveguide exhibits a periodic fluctuation in the refractive index of the modal field of light guided in the waveguide, in the core, and/or in the surrounding cladding material.

"Piezoelectric" as used herein refers to the ability of some materials to generate an electric field or electric potential in response to applied mechanical stress. The piezoelectric effect is reversible in that materials exhibiting the direct piezoelectric effect (the production of an electric potential when stress is applied) also exhibit the reverse piezoelectric effect (the production of stress and/or strain when an electric field is applied).

Mechanisms Related to Precise Energy Dissociation

An atom or molecule is ionized by absorbing a photon of energy equal to or higher than the ionization energy. Multiple photons below the ionization threshold may combine their energies to ionize the atom or molecule by a process known as multi-photon ionization. Resonance enhanced multi-photon ionization (REMPI) is a technique in which a molecule is subjected to a single resonant or multi-photon frequency such that an electronically excited intermediate state is reached. A second photon or multi-photon then ejects the electronically excited electron and ionizes the molecule.

Among a mixture of molecules with different bond dissociation energies, selective activation of one chemical bond requires a mono-chromatic source. For example, in a compound containing N—H (bond dissociation energy of 3.9 eV) and C—H (bond dissociation energy of 4.3 eV) bonds, a specific photon source of 4.0 eV dissociates the N—H bond exclusively.

There are two methods for dissociation of a molecule:

Selective Single Bond Dissociation.

The single bond dissociation approach is based on the photoelectric effect, which stems from the classical photoeffect discovered by Einstein in 1905. This is the basis for modern day spectrometry, the REMPI theory and the quantum structure of light and provides the most efficient and cost effective way to provide hydrogen from urine or any hydrogen source. With the classical photoelectric effect, a single light particle (photon) of proper energy interacts with a single electron of the material. Although this method will dissociate our target bond it also can dissociate other non-target bonds Therefore one must have a very high intensity pulse of specific energy (preferably femtosecond to attoseconds or higher) for multiphoton ionization to occurs such as is found in ultra short light bursts of a flash bulb or proper wave length pulse lasers to precisely dissociate selected bonds. Several photons of energy below the ionization threshold may be combined to ionize an atom. Each bonding electron in each energy state is simultaneously exposed to a multi-photon of monochromic (singular) or short band wavelength (single, double, triple or multi photon) to fully dissociate or expel the electron of a specific bond. The electron can be harvested through fuel cell mechanism and recombined to form a stable oxidized molecule if an oxidizer is present or the positive charged ion can be recombined to form a gas if the environment is anoxic or without any oxidizing agents present.

Examples of a multi-photon ionization include multiphoton ionization and dissociation of CH I at 266 and 355 nm, and near ultraviolet photolysis of ammonia and methylamine using REMPI of $NH_3$ molecules following photoexcitation. Single photons in the infrared spectral range usually are not energetic enough for direct photo-dissociation of molecules. However, after absorption of multiple infrared photons a molecule may gain internal energy to overcome its barrier for dissociation. Multiple photon dissociation (MPD, IR MPD with infrared radiation) can be achieved by applying high powered lasers, e.g. a carbon dioxide laser, or a free electron laser, or by long interaction times of the molecule with the radiation field without the possibility for rapid cooling, e.g. by collisions. The latter method allows even for MPD induced by black body radiation, a technique called Blackbody infrared radiative dissociation (BIRD).

Among a mixture of molecules with different bond dissociation energies, selective activation of one chemical bond requires a mono-chromatic source. For example, in a compound containing N—H (bond dissociation energy of 3.9 eV) and C—H (bond dissociation energy of 4.3 eV) bonds, a specific photon source of 4.0 eV dissociates the N—H bond exclusively. This is not a multi-photon process.

Precise energy separation relies on two main principles. The first principle is that the selective dissociation of one or more target bonds in a target molecule can be achieved by irradiating the target molecule with the specific energy (both frequency and intensity) required to selectively dissociate one or more target bonds and to prevent re-association of the target bond (i.e, the promoter energy). By exciting a target molecule with the precise energy required to dissociate one or more target bonds in a target molecule, one or more target bonds can be selectively cleaved, releasing electrons. Cleaving a bond does not release an electron, it breaks a bond to give either ions or radicals, photoinization will often result in a bond rupture process and/or the photodissociation products could be subsequently photoionized, but nothing inherent about photodissociation would necessarily result in a photoionization process. If one wants to collect electrons from an attoseconds laser set at varying energies of dissociation, one must set up a fuel cell arrangement where there is a current provided between the anode and the cathode. If this is run in an oxygen environment one can, for example, remove the hydrogen, transfer the electron and produce water at the cathode. If this is run in an anoxic environment, one can create hydrogen at the cathode. Because the target molecule is treated with energy specific to dissociate one or more target bonds in a target molecule, a target molecule can be selectively dissociated in a complex mixture. The second principle is that the dissociation of target molecules can involve the dissociation of one or more target bonds. These bonds can be individually dissociated by irradiating the target molecule by a plurality of photons or other energetic sources which provide the promoter energy for each bond to be dissociated.

Given this control, target molecules can be treated using precise energy separation to separate the target molecules into their component products without producing any by-products and without re-association of the one or more target bonds.

II. Precise Energy Generation

A. Materials to be Treated

The liquid or gas to be treated consists of turbid water or air which impairs passage of light to selectively cleave bonds in the targeted material. Target molecules must contain at least one bond to be dissociated. Target molecules can be any compound of the solid, liquid, gas, or plasma physical state. Target molecules can be charged or uncharged. Target molecules can be naturally occurring or synthetically prepared compounds.

In one embodiment, target molecules are in a mixture including non-target molecules, such as a solution containing one or more target molecules. An example of such an embodiment is ammonia dissolved in water. In this embodiment, ammonia is the target molecule, and is dissociated into $N_2$ and $H_2$. Typically the ammonia will also be present in admixture with organic material such as sewage or manure. Water in this embodiment is not dissociated because the energy of dissociation is specific for the energy required to dissociate the N—H bonds of ammonia and not the O—H bonds of water.

Precise energy dissociation can be used to dissociate one or more bonds in almost any molecule. As a consequence, almost any suitable molecule may serve as a target molecule. In general, suitable target molecules can be selected in view of the availability of target molecules, the nature of the dissociation process (including available sources of the promoter energy), and the suitability of component products. For example, the target molecule may be an organic molecule or an inorganic molecule.

In certain embodiments, the target molecule is an organic compound that can be obtained from a renewable source, such as a carbohydrate. Typically, carbohydrates are organic compounds formed exclusively from carbon, hydrogen, and oxygen, typically with the empirical formula $C_m(H_2O)_n$, wherein m and n are independently integers. The carbohydrates may be monosaccharides, disaccharides, oligosaccharides, or polysaccharides. The monosaccharides may be aldoses or ketoses, and may contain any number of carbon atoms (i.e., the monosaccharides may be trioses, tetroses, pentoses, hexoses, heptoses, etc.). Examples of suitable monosaccharides include dihydroxyacetone, glyceraldehyde, erythrulose, threose, erythrose, arabinose, ribose, xylose, ribulose, allose, altrose, mannose, glucose, galactose, sorbose, tagatose, and fructose. Suitable disaccharides include sucrose, lactulose, lactose, maltose, trehalose, and cellobiose. Examples of suitable oligosaccharides include fructo-oligosaccharides (FOS). Examples of suitable polysaccharides include starch, cellulose, inulin, glycogen, chitin, callose, laminarin, chrysolaminarin, xylan, arabinoxylan, mannan, fucoidan and galactomannan. The target molecule may also be an amino sugar, such as N-acetylglucosamine, galactosamine, or sialic acid. The target molecule can also be a nucleic acid such as RNA or DNA, or organic material.

In other cases, the target molecule is waste, a reaction byproduct, or a pollutant. Examples of suitable wastes, reaction byproducts, and pollutants include alkyl sulfonates, alkyl phenols, ammonia, benzoic acid, carbon monoxide, carbon dioxide, chlorofluorocarbons, dioxin, fumaric acid, grease, herbicides, hydrochloric acid, hydrogen cyanide, hydrogen sulfide, formaldehyde, methane, nitrogenous wastes (sewage, waste water, and agricultural runoff), nitric acid, nitrogen dioxide, ozone, pesticides, polychlorinated biphenyls (PCBs), oil, ozone, sulfur dioxide, and sulfuric acid. In some cases, the target molecules are reactive or volatile aliphatic or aromatic organic compounds. Conventional fossil fuels, such as methane or conventional petroleum distillates, may also serve as target molecules.

In still another embodiment, the target molecules are bacteria, parasites, viruses or even animals such as zebra mussels, which are sometimes present in ballast water and which must be killed prior to the water being removed from the ship. In this embodiment there are multiple target bonds including protein, nucleic acid, carbohydrate and combinations thereof that can be cleaved.

A target bond is any bond within a target molecule which is subjected to precise energy separation. Target bonds should possess a dissociation energy or energies which, if applied, will break the target bond, and not allow the bond to reform. Types of bonds that may be selectively dissociated using precise energy separation include covalent bonds, ionic bonds, as well as intermolecular associations such as hydrogen bonds. In some cases, the target molecule contains a single target bond. In other embodiments, the target molecule contains multiple target bonds.

In cases when the target bond is a covalent bond, the bond may be a single bond, double bond, or triple bond. A non-limiting list of exemplary target bonds include N—H, C—H, C—C, C=C, C≡C, C—N, C=N, C≡N, C—O, C=O, C≡O, O—H, O—P, O=P, and C—X bonds, where X is any halogen selected from chlorine, fluorine, iodine, and bromine.

Precise energy separation requires that the energy of dissociation must be specific for the target bond of the target molecule. Bond dissociation energies are well known in the art. Examples of bond dissociation energies include H—H, 104.2 kcal/mol; B—F, 150 kcal/mol; C=C, 146 kcal/mol; C—C, 83 kcal/mol; B—O, 125 kcal/mol; N=N, 109 kcal/mol; N—N, 38.4 kcal/mol; C—N, 73 kcal/mol; O=O, 119 kcal/mol; O—O, 35 kcal/mol; N—CO, 86 kcal/mol; C≡N, 147 kcal/mol; F—F, 36.6 kcal/mol; C—O, 85.5 kcal/mol; C=O (CO2), 192 kcal/mol; Si—Si, 52 kcal/mol; O—CO, 110 kcal/mol; C=O (aldehyde), 177 kcal/mol; P—P, 50 kcal/mol; C—S, 65 kcal/mol; C=O (ketone), 178 kcal/mol; S—S, 54 kcal/mol; C—F, 116 kcal/mol; C=O (ester), 179 kcal/mol; Cl—Cl, 58 kcal/mol; C—C, 181 kcal/mol; C=O (amide), 179 kcal/mol; Br—Br, 46 kcal/mol; C—Br, 68 kcal/mol C=O (halide), 177 kcal/mol; I—I, 36 kcal/mol; C—I, 51 kcal/mol; C=S (CS2), 138 kcal/mol; H—C, 99 kcal/mol; C—B, 90 kcal/mol; N=O (HONO), 143 kcal/mol; H—N, 93 kcal/mol; C—Si, 76 kcal/mol; P=O (POCl₃), 110 kcal/mol; H—O, 111 kcal/mol; C—P, 70 kcal/mol; P=S (PSCl₃), 70 kcal/mol; H—F, 135 kcal/mol; N—O, 55 kcal/mol; S=O (SO₂), 128 kcal/mol, H—Cl, 103 kcal/mol; S—O, 87 kcal/mol; S=O (DMSO), 93 kcal/mol; H—Br, 87.5 kcal/mol; Si—F, 135 kcal/mol; P=P, 84 kcal/mol; H—I, 71 kcal/mol; Si—Cl, 90 kcal/mol; P≡P, 117 kcal/mol; H—B, 90 kcal/mol; Si—O, 110 kcal/mol; 258 kcal/mol; H—S, 81 kcal/mol; P—Cl, 79 kcal/mol; 200 kcal/mol; H—Si, 75 kcal/mol; P—Br, 65 kcal/mol; N=N, 226 kcal/mol; H—P, 77 kcal/mol; P—O, 90 kcal/mol; 213 kcal/mol.

In one embodiment, target bonds are dissociated heterolytically. When heterolytic cleavage occurs, ionic component products may be produced in addition to radicals and ejected electrons, for example:

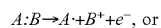

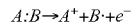

The radicals can re-associate to form A:B, but in preferred embodiments, the radicals re-associate in a homomeric fashion to form A:A and B:B component products. One, two, or more identical radicals can associate to form known ions, atoms, or molecules.

In some embodiments, target molecules contain multiple non-identical atoms, multiple oxidation states, or combinations thereof, all of which contain a variety of types of target bonds. Examples of target molecules with non-identical target bonds containing multiple non-identical atoms are dichloroethane ($CH_2Cl_2$) and ethanolamine ($OHCH_2CH_2NH_2$). Examples of target molecules with non-identical target bonds with multiple oxidation states include ethyl acetylene HC≡CH₂CH₃ and ethyl isocyanate ($CH_3CH_2N=C=O$).

Those skilled in the art will recognize the nature of the target bond and target molecule will determine the identity, frequency, and intensity of energy source. The identity, frequency, and intensity of energy source may also be dependent upon whether or not a catalyst is present within the fuel cell.

The energy of dissociation is the energy required for the dissociation of one or more target bonds in a target molecule, and is specific for the target bond or bonds within a target molecule. The energy of dissociation is tunable and specific for the bond dissociation energy of any target bond within any target molecule.

The energy of dissociation is applied at a frequency and intensity effective for both scission of the target bond and target molecule dissociation. In an example, the target molecule is AB, and application of the energy of dissociation specific for the A-B bond results in ejection of an electron from the target bond yielding a radical, an ion, and an electron, according to the following possible mechanisms:

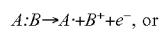

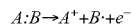

The ions and radicals can be stable isolable species, or can combine with other ions to form molecules, i.e., the component products. The ejected electrons can be captured by an electron sink via an electrode. The intensity of the energy of dissociation should be such that re-association of components back into the target molecules does not occur.

In one embodiment, application of the energy of dissociation satisfies the bond dissociation energy of the target bond of a target molecule via a one step electronic process, and the target bond is dissociated. Once one target bond has been dissociated, the energy of dissociation source can be tuned to the frequency of a second target bond dissociation energy and applied to the sample to affect dissociation of a second target bond. The energy of dissociation sources can be tuned as needed to dissociate all target bonds of the target molecule. There are numerous apparatuses that can provide multi-energy or photons within a nano second or quicker to effect irreversible dissociation and prevent formation of reactants from the dissociated target molecule components.

In another embodiment, application of the energy of dissociation satisfies the bond dissociation energy of the target bond of a target molecule via a process involving the Rydberg excited state of the target molecule. First, the energy of dissociation source excites the target molecule to a Rydberg state, wherein the energy required to nearly remove an electron from the ionic core (the ionization or dissociation energy) of a target molecule has been achieved. Next, the same or different energy of dissociation source then supplies sufficient energy to eject the excited electron from the target bond. In this embodiment, one or more energy of dissociation sources can be used for each step. Once one target bond has been dissociated, the energy of dissociation source can be tuned to the frequency of a second target bond dissociation energy. The energy of dissociation sources can be tuned as needed to dissociate all target bonds of the target molecule.

For example, treatment of ammonia with an energy of dissociation occurs via the two-step process involving the Rydberg State. First, energy provided by an intense femtosecond laser of dissociation treatment of 532 nm excites a shared electron in the N—H bond such that ammonia is in an excited Rydberg state. Subsequent energy of dissociation treatment of 1064 nm energy expels the electron and dissociates ammonia into $NH_2^+$ and H. Subsequent dissociative processes will give component products which re-associate to form $N_2$ and $H_2$.

In one embodiment, the one-step process, the two-step process, or a combination thereof are used to dissociate the target molecule. In one embodiment, one or more energy of dissociation sources are used for dissociation of each target bond within a target molecule. In one embodiment, one or more energy of dissociation sources are used in combination for dissociation of each target bond within a target molecule.

An exemplary molecule contains N—H, C—O, and O—H bonds.

An example of a Femtosecond multiphoton ionization of ammonia clusters was described by S. Wei, et al. J. Chem. Phys. 102, 4832 (1995) who studied the mechanisms of their ionization and the subsequent formation of the protonated ammonia cluster ions are studied using a femtosecond pump-probe technique at 620 nm. It was found that an intermediate corresponding to C' states of the monomer is responsible for the ionization of ammonia clusters. Femtosecond pump-probe studies show that the lifetime of the intermediate to the formation of the protonated cluster ions $(NH_3)_nH^+$ (n=1-5) is the same as that leading to the formation of the unprotonated cluster ions $(NH_3)_m^+$ (m=2-5).

The results provide direct experimental proof that formation of the protonated cluster ions takes place through an absorption-ionization-dissociation mechanism". These results are not specific for $NH_3$ but generally applicable to multi-photon dissociation. The 193 nm should be the UV band in $NH_3$. 214 nm would correspond to the common UV band for a primary amine. This combination of wavelengths would photoionize more than just primary amines. The n-pi* band in many organic acids, ie. formic acid, is 214 nm. An absorption band can be as narrow as 1 nm or as wide as 20 nm. Each target contaminant bond has an optimal wavelength for photodissociation where its effectiveness, described by the molar extinction coefficient E, is the largest. For example, benzene absorbs strongly at 184 nm (E=47,000) and at 202 nm (E=7,000) plus has a series of weak absorption bands between 230 nm and 270 nm (~~3300 A). Acetone has absorption bands at 220 nm (E=16,000) and 318 nm (c=30), while TCE has a strong band around 230 nm. The C—O bonds are cleaved with a mono-chromatic pulse generator. The O—H bonds are cleaved with a combination of photocatalyst and UV radiation. All of these energy of dissociation sources comprise the energy of dissociation required for complete dissociation of all the bonds of the target molecule. In some cases this requires three or more bond energies to expel the electron. In some cases, a filter may be used to isolate wavelengths or energies from a wide range source.

B. System for Selective Cleavage of Bonds

Energy source intensity is the quantity of energy supplied to treat a target molecule. Energy source intensity is directly proportional to the number and percentage of bonds which can be dissociated. Low intensity energy sources have the capability to dissociate a smaller proportion of target bonds compared to a higher intensity energy sources. For example, in a photonic energy source, the greater the number of photons present, the higher the likelihood of ejecting electrons.

1. Energy Source Frequency

The frequency of energy source (in photonic cases, the wavelengths of radiant energy) specifically dissociates target bonds of target compounds. One frequency, multiple selected frequencies, or combinations of energy source frequencies can be used depending on the chemical structure of the target material. The apparatus must deliver sufficient intensity of the dissociation energy to completely dissociate the bond in adequate numbers to satisfy the need of the end user.

In one embodiment, energy source intensity is increased by use of a pulse generator in conjunction with a lamp of the proper wavelength, or a tunable laser. In a preferred embodiment, the pulse generator supplies a predetermined number of pulses per second.

Methods of determining the appropriate frequency at which a target bond can be dissociated are known in the art, and include resonance enhanced multi-photon ionization (REMPI) spectroscopy, resonance ionization spectroscopy (RIS), photofragment imaging, product imaging, velocity map imaging, three-dimensional ion imaging, Raman spectroscopy, centroiding, zero electron kinetic imaging (ZEKE), mass enhanced threshold ionization (MATI), and photo-induced Rydberg ionization (PIRI).

Wavelengths to dissociate hydrogens from ammonia are 193, 214, 222, 234, and 271 nm. Three or more of these wavelengths in combination break $NH_3$ into its components: $N_2$ (g) and $H_2$ (g) without producing ozone. Examples of multiphoton wavelengths for dissociation include 532 nm and 1064 nm, both of which are required at very high intensities. A wavelength of 248 nm will break down Ozone. In a preferred embodiment, the energy of dissociation source frequency range is from 115 nm to 400 nm, with appropriate filters, to satisfy the precise frequency of dissociation energies required for hydrogen dissociation only. Adjustments are made for cage effect and molecular interaction.

In one embodiment, the energy source frequency is supplied by a tunable laser or light energy source that subjects samples to a mono-energy.

If the proper dissociation bond energy at a sufficient intensity to dissociate a selected bond or group of bonds is applied, there are no indiscriminate or random molecules or atoms produced other than what will be determined by the selected bonds which are targeted for dissociation, eliminating the random production of undesirable by-products or intermediates seen in oxidation and reduction, microbial or indiscriminate chemical reaction. An electron sink can also be added to the process to insure that there is no recombination or potential for intermediate or by-product production.

It is important to provide a catalyst to produce sufficient energy to dissociated bonds in molecules within a turbid environment, as discussed below. The catalyst and wavelength in combination must produce sufficient energy to cleave the targeted bond(s).

2. Optical Fiber Devices

Side-emitting optical fiber devices capable of carrying and emitting tunable sources of energy, the precise energy of separation for one or more target bonds in one or more target molecules, are used for maximum efficacy. Side-emitting optical cables are available which can accept various light sources and distribute them along a linear path. Side-emitting fibers may incorporate notches along the surface or cladding of the fiber which reflects a portion of the light out of the fiber at discrete points. Alternatively, optical fibers for side-emission may incorporate regions having differing indices of refraction or multiple scattering sources along the length of the fiber so as to refract light out the side of the fiber at various locations.

Fiber Geometry

The side-emitting optical fibers for precise energy generation may be fabricated in any geometry giving the desired properties for the intended application. The side-emitting optical fiber core may contain one or several materials with appropriate dielectrics. In some embodiments the dielectric of the core materials is selected to transmit UV light. In a preferred embodiment, a glass core is selected to transmit UV light, minimum-3.8 and maximum-14.5 The side-emitting optical fiber may optionally contain one or more cladding layers, optionally one or more protective or supportive layers, and optionally one or more additional layers.

In some applications, the optical fiber is a single-mode optical fiber that may optionally have a diameter less than 250 microns, preferably less than 100 microns, more preferably less than 50 microns, most preferably less than 10 microns. In certain embodiments, the optical fiber is a nanofiber having a diameter less than 1 micron, preferably less than 500 nm, more preferably less than 100 nm. Optical fibers include optical cables, optionally with outside diameters from 1 to 50 mm, preferably from 1 to 30 mm, more preferably from 5 to 20 mm.

In certain embodiments the optical fiber geometry is homogenous along the longitudinal axis. The optical fiber may optionally contain scattering elements designed to scatter light in a direction significantly perpendicular to the longitudinal axis. The side-emitting optical fiber may optionally contain notches at discreet points along the cladding layer, optionally along the supportive or protective layers, and optionally along the additional exterior layers that give rise to light being coupled out the side of the optical fiber.

The optical fiber is typically axially symmetric. In some embodiments, the optical fiber contains a core and/or a cladding layer that is not axially symmetric.

Photonic-crystal fiber (PCF) is a class of optical fiber based on the properties of photonic crystals. Because of its ability to confine light in hollow cores or with confinement characteristics not possible in conventional optical fiber, PCF is now finding applications in fiber-optic communications, fiber lasers, nonlinear devices, high-power transmission, highly sensitive gas sensors, and other areas. More specific categories of PCF include photonic-bandgap fiber (PCFs that confine light by band gap effects), holey fiber (PCFs using air holes in their cross-sections), hole-assisted fiber (PCFs guiding light by a conventional higher-index core modified by the presence of air holes), and Bragg fiber (photonic-bandgap fiber formed by concentric rings of multilayer film). In general, regular structured fibers such as photonic crystal fibers, have a cross-section (normally uniform along the fiber length) microstructured from one, two or more materials, most commonly arranged periodically over much of the cross-section, usually as a "cladding" surrounding a core (or several cores) where light is confined. For example, the fibers first demonstrated by Russell consisted of a hexagonal lattice of air holes in a silica fiber, with a solid (1996) or hollow (1998) core at the center where light is guided. P. St. J. Russell, "Photonic crystal fibers," *Science* 299, 358-362 (2003); P. St. J. Russell, "Photonic crystal fibers", *J. Lightwave. Technol.*, 24 (12), 4729-4749 (2006). Other arrangements include concentric rings of two or more materials. Photonic crystal fibers can be divided into two modes of operation, according to their mechanism for confinement. Those with a solid core, or a core with a higher average index than the microstructured cladding, can operate on the same index-guiding principle as conventional optical fiber, however, they can have a much higher effective-refractive index contrast between core and cladding, and therefore can have much stronger confinement for applications in nonlinear optical devices, polarization-maintaining fibers, (or they can also be made with much lower effective index contrast). Alternatively, one can create a "photonic bandgap" fiber, in which the light is confined by a photonic bandgap created by the microstructured cladding—such a bandgap, properly designed, can confine light in a lower-index core and even a hollow (air) core. Bandgap fibers with hollow cores can potentially circumvent limits imposed by available materials, for example, to create fibers that guide light in wavelengths for which transparent materials are not available (because the light is primarily in the air, not in the solid materials). Another advantage of a hollow core is that one can dynamically introduce materials into the core, such as a gas that is to be analyzed for the presence of some substance. PCF can also be modified by coating the holes with sol-gels of similar or different index material to enhance its transmittance of light.

Figure 2:
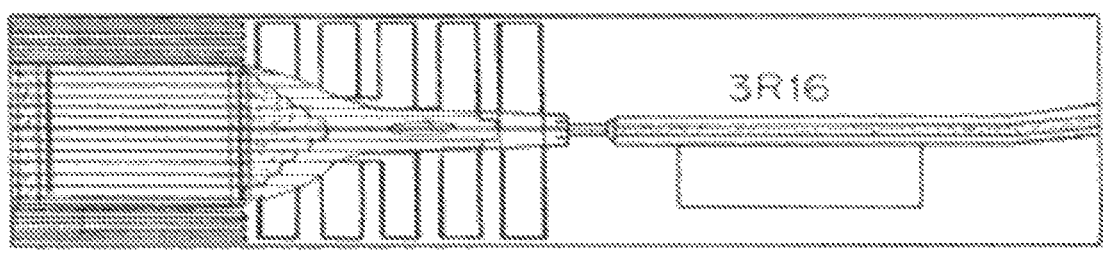
FIG. 2 is a prospective view of tunable microarray, allowing for single or multiple frequency distribution.

A single tube as shown in FIG. 1A or a multi tube shown in FIG. 2 can be used. The multi-tube can be tapered over a greater distance for increased surface exposure or separated into an over/under (woven) fiber mesh or any array which will provide exposure to the target molecules for a flow through application. This array can be of single frequency or single modes to many modes.

Due to the index difference created by the microstructure of air-gaps within cladding, making polarization maintaining variants effectively form birefringent, by virtue of the unitary index of the air that makes-up the bulk of the optical cladding, a huge degree of anisotropy may be generated, with correspondingly huge levels of birefringence, up to an order of magnitude greater than has been achieved from conventional, stress birefringent designs.

The fabrication technique for Microstructure ('Holey') Fibers bears little resemblance to that of any other PM fiber for the simple reason that it does not rely on direct, chemical vapour deposition to create the preform. Microstructure fiber preforms are fabricated by building a close-packed arrangement of silica tubes around a central, silica rod that replicates the desired fiber structure. Precision-machined jigs are used to facilitate this process and the completed preform is typically held together with platinum wire during drawing. Exceptional precision is essential during the assembly of the preform, together with fine control of all drawing conditions to ensure that viscous forces do not distort the fiber during formation. Chemical vapour deposition may still be used to fabricate the high-purity, fused silica components that make-up the preform.

Optical cables may contain only one type of optical fiber. In certain applications, the optical cable contains one type of optical fiber that transmits a discrete frequency or frequencies of light. In some embodiments, the optical cable will contain many different types of optical fibers. In some embodiments one or a few types of optical fibers within the cable are designed to carry specific wavelengths of light for targeting specific molecules and/or specific bonds. For certain applications it will be beneficial to combine multiple groups of optical fibers, each designed for carrying the wavelength or wavelengths of light for a specific molecule or bond into a single optical cable. In some embodiments, each group specific for a given molecule or bond is individually addressable by a power source at the end of the optical cable. In some embodiments, the optical cable contains a single type of optical fiber collected into multiple groups wherein each group is individually addressable by a power source at the end of the optical fiber.

Exemplary optical fibers will contain an optical fiber core material with a higher refractive index optionally surrounded by a cladding layer with lower refractive index. The industry standard for data communications is now 50 μm and 62.5 μm multimode using silica glass fibers. For purposes described herein, the preferred NAs are 0.20 for 50/125 μm fiber and 0.275 for 62.5/125 μm fiber. Optimally the use of a multimode fiber made of glass which can transmit in the UV spectrum.

Materials

The optical fiber core material may be any material having the appropriate index of refraction and ductility. Exemplary optical fiber core materials may include glassy materials. Exemplary glassy materials for the optical fiber core may include silica or quartz, doped silica glasses such as germanosilicate glasses, borosilicate glasses, fluorosilicate glasses, or aluminosilicate glasses, certain chalcogenide glasses or heavy metal oxide glasses. Exemplary optical fiber core materials may include plastic polymer materials. Exemplary polymers for the optical fiber core may include poly (methyl methacrylate), polyperfluorobutenylvinylether, or polystyrene.

The optical fiber cladding material may be any material with appropriate ductility and with an appropriate index of refraction when used in combination with the optical fiber core material. The optical fiber cladding material will, in some preferred embodiments, have a dielectric constant that is lower than that of the optical fiber core material. In some preferred embodiments, the optical fiber cladding material will have substantially the same index of refraction as the optical fiber core material.

Light and Energy Sources

Lasers are devices giving out intense light at one specific color. They are little pieces of semiconductor material, such as grapheme, specially engineered to give out very precise and intense light. Within the semiconductor material are lots of electrons, negatively charged particles. Some of these electrons are in an "excited" state and can just spontaneously fall down to the regular "ground" state. The ground state has less energy, and so the excited-state electron must give out its extra energy before it can enter the ground state. It gives this energy out in the form of a "photon", a single particle of light.

An electric current is applied to the laser to puts many of the electrons into an excited state.

Decay of the excited electrons at the same time produces light. The spontaneously emitted photons travel back and forth through the laser time and time again, because these photons can encourage other excited electrons to fall to the ground state and give out more photons. These photons stimulate emission of further photons, and therefore effectively amplify the light within the device. At the same time an electric current is putting more electrons into the excited state where they wait to fall to the ground state and give out light. Hence the name LASER—Light Amplification by Stimulated Emission of Radiation (the radiation in this case is light).

Different materials can be used to obtain different wavelengths from the laser. In actual fact, most lasers used in optical networks will operate at wavelengths of around 1300 nm or 1550 nm, as these are points of minimum loss within optical fibers. The operation of a ruby laser illustrates the basic lasing principle. When optically "pumped" by light from the flash tube, the ruby rod becomes a gain medium with a huge excess of electrons in high-energy states. As some electrons in the rod spontaneously drop from this high-energy level to a lower ground state, they emit photons that trigger further stimulated emissions. The photons bounce between the mirrors at the ends of the ruby rod, triggering ever more stimulated emissions. Some of the light exits through the half-silvered mirror.

Tunable lasers are semiconductor-based lasers that operate on similar principles to the basic non-tunable versions. Most designs incorporate some form of grating like those in a distributed feedback laser. These gratings can be altered in order to change the wavelengths they reflect in the laser cavity, usually by running electric current through them, thereby altering their refractive index. The tuning range of such devices can be as high as 40 nm, which would cover any of 50 different wavelengths in a 0.8 nm wavelength spaced system.

A laser's wavelength is determined by its optical cavity, or resonator. Like an organ pipe, it resonates at a wavelength determined by two parameters: its length—the distance between the mirrors—and the speed of light within the gain medium that fills the cavity. Accordingly, the wavelength of a semiconductor laser can be varied either by mechanically adjusting the cavity length or by changing the refractive index of the gain medium. The second approach is most easily done by changing the temperature of the medium or injecting current into it.

There are basically four types of tunable lasers:
Distributed Feedback (DFB)
Distributed Bragg Reflector Laser (DBR)
External Cavity Laser diode (ECDL)
Vertical-Cavity Surface-Emitting Lasers (VCSEL)

Among the most common diode lasers used in telecommunications today are distributed feedback (DFB) lasers. They are unique in that they incorporate a diffraction grating directly into the laser chip itself, usually along the length of the active layer (the gain medium). As used in DFB lasers, the grating reflects a single wavelength back into the cavity, forcing a single resonant mode within the laser, and producing a stable, very narrow-bandwidth output.

DFB lasers are tuned by controlling the temperature of the laser diode cavity. Because a large temperature difference is required to tune across only a few nanometers, the tuning range of a single DFB laser cavity is limited to a small range of wavelengths, typically under 5 nm. DFB lasers with wide tuning ranges therefore incorporate multiple laser cavities.

A variation of the DFB laser is the distributed Bragg reflector (DBR) laser. It operates in a similar manner except that the grating, instead of being etched into the gain medium, is positioned outside the active region of the cavity. Lasing occurs between two grating mirrors or between a grating mirror and a cleaved facet of the semiconductor.

Tunable DBR lasers are made up of a gain section, a mirror (grating) section, and a phase section, the last of which creates an adjustable phase shift between the gain material and the reflector. Tuning is accomplished by injecting current into the phase and mirror sections, which changes the carrier density in those sections, thereby changing their refractive index.

The tuning range in a standard DBR laser seldom exceeds about 10 nm. Wider tuning ranges can be achieved using a specialized grating, called a sampled grating, which incorporates periodically spaced blank areas. A tunable sampled-grating DBR (SG-DBR), for instance, uses two such gratings with different blank area spacing. During tuning, the gratings are adjusted so that the resonant wavelengths of each grating are matched. The difference in blank spacing of each grating means that only a single wavelength can be tuned at any one time. Many wavelengths at one time are preferred.

Since tuning with this sampled-grating technique is not continuous, the circuitry for controlling the multiple sections is far more complex than for a standard DFB laser. Also, the output power is typically less than 10 mW.

The GCSR laser is a monolithic widely tunable laser on InP based on a codirectional coupler cascaded with a sampled Bragg reflector. The laser is a four-electrode device where three of them are used for tuning the wavelength. The tuning performances are a discontinuous tuning range over 100 nm, and full wavelength coverage, i.e. any wavelength can be accessed by a setting the correct combination of the three tuning currents, over 67 nm. These may give access to a huge bandwidth in fibers, i.e. 12.5 THz, or be used for multiple sensor or measurement applications.

Another variation of the DBR laser is a grating-assisted co-directional coupler with rear sampled reflector. Patented by Altitun, ADC's Swedish acquisition, the structure uses a three-section DBR tunable across 40 channels, from 1529 to 1561 nm. It uses a conventional laser chip and one or two mirrors, external to the chip, to reflect light back into the laser cavity. To tune the laser output, a wavelength-selective component, such as a grating or prism, is adjusted in a way that produces the desired wavelength.

This type of tuning involves physically moving the wavelength-selective element. One ECDL implementation, for example, is the Littman-Metcalf external cavity laser, which uses a diffraction grating and a movable reflector. ECDLs can achieve wide tuning ranges (greater than 40 nm), although the tuning speed is fairly low—it can take tens of milliseconds to change wavelengths. External cavity lasers are widely used in optical test and measurement equipment.

An advantage of this Littman-Metcalf external cavity laser from New Focus is that it is built around a standard, fairly inexpensive, solid-state laser diode. Its external diffraction grating and movable reflector together constitute a variable-wavelength filter, which adjusts the output wavelength. The movable reflector gives the laser both its great advantage and its main weakness—a wide tuning range and a low tuning rate, respectively.

ECDLs can achieve wide tuning ranges (greater than 40 nm), although the tuning speed is fairly low—it can take tens of milliseconds to change wavelengths. External cavity lasers are widely used in optical test and measurement equipment.

ECDLs are attractive for some applications because they are capable of very high output powers and extremely narrow spectral widths over a broad range of wavelengths. New Focus Inc., in San Jose, Calif., introduced an external cavity diode laser for such applications. The fairly high-power (20-mW) device can tune across 40 nm (50 channels). It includes a wavelength locker, power control, and control electronics.

External cavity lasers with continuous tuning have been traditionally used in optical test and measurement equipment since they provide high power, large tuning range, and narrow line widths with high stability and low noise. Furthermore, they provide continuous tuning through the entire spectrum of the gain medium, where other common laser technologies (like DBR's) exhibit mode hops between stable points in the spectrum. However, ECLs were generally too large, costly, and sensitive to shock and other environmental influences to be used.

Recent technological advances, however, have brought ECLs to the forefront of optical networking component technology. In particular, the application of MEMS to optical component designs produces high performance micro-optics that readily fit on standard transmitter cards, and that can be manufactured at competitive costs in the optical networking industry.

The alternative to edge-emitting lasers is the vertical-cavity surface-emitting laser (VCSEL). Rather than incorporating the resonator mirrors at the edges of the device, the mirrors in a VCSEL are located on the top and bottom of the semiconductor material. This setup causes the light to resonate vertically in the laser chip, so that laser light is emitted through the top of the device, rather than through the side. As a result, VCSELs emit much more nearly circular beams than edge-emitting lasers do and the beams do not diverge as rapidly. These benefits enable VCSELs to be coupled to optical fibers more easily and efficiently.

Since fabricating VCSELs requires only a single process growth phase, manufacturing them is much simpler than producing edge emitters. VCSEL manufacturers can also exploit wafer-stage testing, thus eliminating defective devices early in the manufacturing process, saving time, and improving overall component manufacturing yields. Edge-emitting lasers cannot be tested until the wafer is separated into individual dice because only then do the light-emitting edges become accessible. Because of these features, VCSEL chips can be produced far less expensively than edge-emitting lasers.

In tuning VCSELs, the technique used is based on mechanical modification of the laser cavity using micro electro mechanical systems (MEMS) technology. With MEMS, a movable mirror can be fabricated at one end of the laser cavity. This approach enables VCSEL/MEMS devices to achieve a relatively wide tuning range—preliminary specifications from manufacturers quote tuning ranges of 28-32 nm, enough to cover 35-40 channels at the standard 0.8-nm channel spacing.

To boost a VCSEL's optical output power, some manufacturers include an optical pump source (typically a laser diode at a slightly lower wavelength). Using pump lasers, though, makes the laser module more complex, increases power requirements, and raises costs.

The side emitting technology in a tunable laser for use with a fiber optics situation and a high power laser of proper wavelength range to supply the mesh which with the light and then pick and choose the desired wavelength emitted from each section of the mesh or fiber optic. The fiber optic can be coated with a catalyst and a current used to activate the section as is done in the tunable lasers or we could use a dielectric method or a tunable laser which sends out a specific wavelengths or number of selected wavelengths to a receptor mesh which can be set up for different contaminants could also be used. If a tunable laser is used then one needs to supply the side emitting fiber with the appropriate multi photon dissociation energies as determined by a sensor such as a Raman spectrograph located in the flow before the mesh and coupled to a sensor driven action response software system. The tunable lasers will need to be of sufficient frequency ranges to provide the correct modes or ranges of dissociation frequencies (energies) to dissociate the identified target molecules.

Spectral purity and high side-mode suppression ratio (SMSR) allow for increased channel density. High SMSR significantly reduces cross talk in systems with high channel counts, especially in networks that are based upon periodic multiplexing architectures that lack the input selectivity of fiber-Bragg gratings, thin film, or other narrowband technologies.

Catalysts

Catalysts enhance the rate of bond dissociation. The catalyst can be any material of any physical configuration which is compatible with the sample and any other energy of dissociation sources. Catalysts may be unifunctional, multifunctional, or a combination thereof. Catalysts can be used alone or in combination with other catalysts. In certain embodiments, the catalyst is used to drive the reaction to approximately 100% completion (e.g., to dissociate essentially all of a target molecule.)

In a preferred embodiment, an energy source includes a photocatalyst and photonic (light-based) energy source. The photocatalyst provides an effective means for converting light into chemical energy. The catalyst or photocatalyst may be a semi-conductive material such as titanium oxides, platinized titania, amorphous manganese oxide, and copper-doped manganese oxide, titanium dioxide, strontium titanate, barium titanate, sodium titanate, cadmium sulfide, zirconium dioxide, and iron oxide. Photocatalysts can also be semiconductors that support a metal, such as platinum, palladium, rhodium, and ruthenium, strontium titanate, amorphous silicon, hydrogenated amorphous silicon, nitrogenated amorphous silicon, polycrystalline silicon, and germanium, and combinations thereof. Catalysts or photocatalysts can be carbon-based graphene or graphite, as well as carbon-doped semi-conductive or other magnetic material, for example, graphene doped AMO. Other catalysts include Nickel-molybdenum-nitride, nickel-hydrogen ($NiH_2$ or $Ni-H_2$), $Au-TiO_2$, CdS, $NaTaO_3$, $K_3Ta_3B_2O_{12}$, $Ga_{82}Zn_{18})(N_{82}O_{18})$, and $Pt/TiO_2$. Photocatalysts based on cobalt have been reported. Members are tris(bipyridine) cobalt(II), compounds of cobalt ligated to certain cyclic polyamines, and certain cobaloximes, cobalt(II)-hydride, indium tin oxide (ITO) anode, poly(3,4-ethylenedioxythiophene), catalysts made of cobalt (Co), nickel (Ni) and iron (Fe) elements, and titanium disilicide.

Catalysts may be modified to increase or optimize activity. Some of the parameters to increase activity include enhanced surface area, optimization of $[Cu^{2+}]$, and resultant morphology. The electronic properties of the catalyst may also be important since the AMO is mixed valence ($Mn^{2+}$, $Mn^{3+}$, $Mn^{4+}$) and possible reduction of $Cu^{2+}$ to $Cu^{1+}$. The most active photocatalysts can be analyzed with X-ray photoelectron spectroscopy to study the oxidation state of the copper in these materials. Catalysts are characterized with X-ray powder diffraction (XRD) to study any crystallinity of the materials, electron diffraction (ED) in a transmission electron microscope (TEM) to study both crystalline and amorphous content of the catalyst, and atomic absorption (AA) for compositions of the catalyst. Semi-quantitative analyses of the solid sample can be done by energy dispersive X-ray analyses in a scanning electron microscope (SEM).

In the preferred embodiment, the optical fibers include a photocatalyst to enhance the efficacy of the emitted light. In one embodiment, photocatalytic processes use ultraviolet light promoters, supplied by ultraviolet energy sources that are positioned to emit photons of ultraviolet light. The ultraviolet light sources are generally adapted to produce light having one or more wavelengths within the ultraviolet portion of the electromagnetic spectrum. However, the method should be understood as including ultraviolet light sources that may produce other light having one or more wavelengths that are not within the ultraviolet portion (e.g., wavelengths greater than 400 nm) of the electromagnetic spectrum.

In other photocatalytic processes, the energy source is replaced by other devices, such as lamps or bulbs other than ultraviolet fluorescent lamps or bulbs; non-ultraviolet light emitting diodes; waveguides that increase surface areas and direct ultraviolet light and any energy light source that activates a photocatalyst; mercury vapor lamps; xenon lamps; halogen lamps; combination gas lamps; and microwave sources to provide sufficient energy to the photocatalyst substance to cause the bond dissociation to occur.

In one embodiment, the photocatalyst is applied to the surface of a fiber optic device and activated from the inside by the specific energy of dissociation. The fiber optic device can be placed into a membrane through which air, solids or liquids flows, or integrated within an electrode. In some embodiments, the fiber optic device is coated with a layer of a catalyst for precise energy separation, such as graphene. The catalyst can be excited, for example by light traveling through the fiber optic device. If desired, the catalyst present on the fiber optic device can be coated with a protective coating. The protective coating needs to be a material which will not inhibit the light or the dissociation of the target bond. The catalyst could be of a material such as Graphene, Silicene, Graphyne, Graphdiyne, and Graphane which could transmit photon and electron concurrently.

FIGS. 1A and 1B show schematically deposition of catalysts within a fiber optic tube (FIG. 1B) by administration of the appropriate gas into the tube as it is turned, for example, on a lathe (FIG. 1A).

III. Methods of Use

These devices may be used in a variety of applications including fuel cells, biofuels, chemical creation, water reclamation, treatment of waste-water, industrial waste, aquaculture, chemical remediation, and for air purification, sterilization, disinfection, etc.

The use of the system is exemplified by the following description of the treatment of ballast water using the fiber optic system.

The parameters for a light treatment system for ballast water on a ship include the following:

Light must be deliverable in the 253.7 nm wavelength. (Note, most "germicidal" UV water treatment systems state that they operate at 254 nm).

Light must arrive at the water in question with an irradiance of 03 μm.

The method must be usable onboard naval vessels and handle 22000 GPM.

There are many problems in UV purification systems. Although UV light penetrates water, turbid water with dirt, algae, and other impurities stops most UV light from penetrating. UV absorption in sea water is worse than normal light and UV light absorbs faster than visible spectrum.

One percent of light penetrates 2 cm of water that has a turbidity rating of 200. Below is an example of relative turbidities.

The total scattering coefficient of seawater is defined as:

$$b(1)=bw(1)+bp(1) \qquad (1.2)$$

where $bw(1)$ represents the scattering by pure water and $bp(1)$ is the scattering by particles (algal and non-algal, i.e., turbidity).

The scattering by dissolved substances is considered to be negligible.

The delivery mechanism must ensure that at least 0.03 μm of light arrives and penetrates the water to a degree of irradiating the whole diameter of the system. A method that utilizes spirals of light emitting fiber housed in crystal sheathes at intervals of 4-5 cm or roughly 2 inches has been devised. When placed into a standard 6 inch basket strainer housing this gives two inserts to expose the entire volume of water, with minimal water interference. The fiber can be braided to increase light emission.

Either a custom made diffuser manufactured into the crystal sleeve, or side emitting UV fiber will be the most efficient. A side emitting fiber that emits 10 percent per foot with a loss of 1 foot is acceptable. This demonstrates that one must have 11 feet of fiber optic cable before the loss would exceed required light output. This is compensated by using a higher power laser. UV light attenuates in silica (the "Fiber Loss"). Fused Quartz is the best material to use for transporting UV, with better transmission using purer quartz.

Most commercially available UV lasers that are compact enough to utilize efficiently are all double to quadrupled wavelengths that thereby decrease the power significantly. The Trumpf TruPulse 33 model, a standard pulsed laser in the 254 nm range that has a minimum average power of 30 W with a max pulse power of 30 J, may be utilized as a single laser. Alternatively, multiple lasers, one per fiber, can be used to maximize each run. In addition, ending each fiber with a Bragg grating and inserting an optical isolator just after the source, will increase the output. The grating will act as a mirror to return the light that is left and the isolator will prevent the return light from overpowering the source. The fibers can be single strand or braided and coupled per laser although it is preferred to use single strand due to complexity of coupling multiple strands to single laser source. This will also eliminate the loss of UV from coupling and absorption.

In another embodiment, one can use hollow fiber to negate the high attenuation loss or instead of fibers, use diffusors. There would still be a high attenuation factor but with the proposed catalyst and the decrease in coupling loss this should be a viable alternative. The diffusers must be coupled to the lasers, with the lasers outside the system and the diffuser inside the water which would be fiber.

Figure 5:
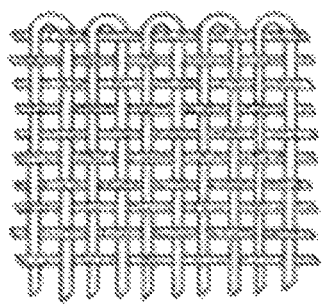
FIG. 5 is a woven design showing a single fiber optic tube woven around the tubes conveying the materials to be treated.

A woven system of fiber optics and tubes carrying material to be treated is shown in FIG. 5.

Alternatively, one could use lamps instead of lasers.

Assuming the following parameters:

Pipe Diameter=48 in; Must be between 6 inches and 24 inches.

Number of Flash Tubes=5; Must be between 2 and 20.

Flash Tube Length=72 in.; Must be between 36 in and 240 in (20 ft.).

Cross Section Distance=72 in.; Distance of cross section over which the lightfield is evaluated from beginning of tube.

Flash Tube Power=500 W Power output in watts. Should be between 5 and 100 W.

Tube Diameter=4 in; should be between 1 in and small enough for space between adjacent tubes.

Tube Distance=12 in Distance of tubes from center of pipe. Tubes must not overlap each other or the pipe walls.

Pulse Duration=0.1 s Duration of each pulse in seconds. Should be between 0.0001 s and 1.0 s.

Duty Cycle in percent of the pulse. Must be between 0.1% and 50%.

Pulses per Second=6 Hz; Not needed if duty cycle and pulse duration are provided. Must be between 1000 Hz and 1 Hz.

Time Between Pulses (seconds, s) Time from the start of one pulse to the start of the next pulse. Not needed if pulses per second or pulse duration and duty factor are provided Filter Transmittance=20% percent of flash tube energy that passes through the filter. It must be between 1% and 50%.

Radiation Length=150 Distance in inches the UV travels through the water to be absorbed to 1/e (0.3678) of original value.

Using these parameters, the minimum time spent in chamber 0.58 s, with approximately 6 pulses per second. The light field intensity over the cross section of the disinfection chamber was 6 Hz and 0.1 s pulses. The EPA recommends 2.5 mW-s/cm$^2$; this intensity over 0.1 s requires a minimum intensity of 25 mW/cm$^2$. The power required from each bulb pulse is about 500 W.

Figure 6A:
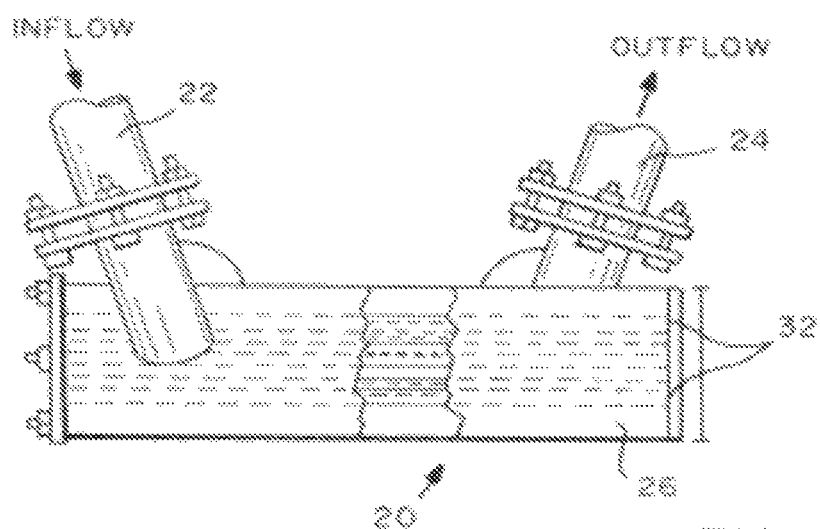
FIGS. 6A, 6B, and 6C are expanded views of the woven design of FIG. 5, showing a pair of U-shaped fiber optics encased in quartz tubing to prevent wavelength disturbance in the stainless steel pipe disinfection chamber.
Figure 6B:
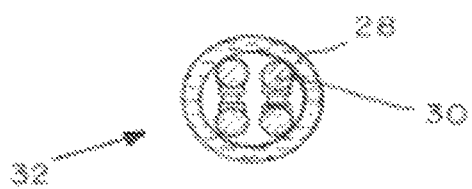
Figure 6C:
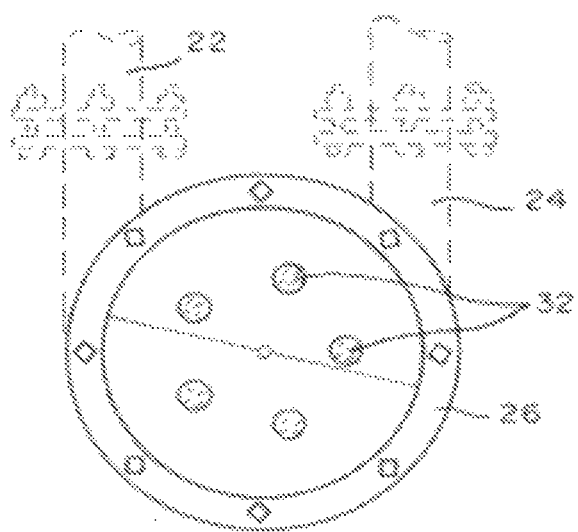

An expanded view a treatment system 20 is shown in FIGS. 6A-6C. FIG. 6 shows the tubes transporting material into 22 and out of 24 the ultraviolet bulb treatment region 32 within a stainless steel pipe 26. FIG. 6B shows in cross-section the U-shaped UV bulbs 30 within quartz tubing 28. FIG. 6C shows the embodiment of FIG. 6A in cross-section, with a stainless steel pipe 26 containing multiple U-shaped UV bulbs within quartz tubing 32, for treatment of fluid entering through inlet 22 and outlet 24.

A simple basket strainer is a standard unit that can be placed in any ship, and can handle the flow rate required, that can be used to reduce turbidity and lower the power requirements/treatment time. The modular nature of the strainer allows a base line for use in scaling the delivery mechanism. If the strainer is larger in diameter, or shorter in length, than the components adjust by the same amount.

Unless defined otherwise, all technical and scientific terms used herein have the same meanings as commonly understood by one of skill in the art to which the disclosed invention belongs. Publications cited herein and the materials for which they are cited are specifically incorporated by reference. Those skilled in the art will recognize, or be able to ascertain using no more than routine experimentation, many equivalents to the specific embodiments of the invention described herein. Such equivalents are intended to be encompassed by the following claims.

I claim:

1. A method comprising:
   by a sensor, determining a bond dissociation energy of a molecular bond in a flow of material;
   providing a light source that is tunable across a range of light frequencies;
   by a system that comprises software, tuning the light source to a selected light frequency within the range in accordance with the bond dissociation energy as determined by the sensor; and
   by the light source, dissociating the molecular bond by irradiating the flow of material with light of the selected light frequency.

2. The method of claim 1, wherein determining the bond dissociation energy comprises performing Raman spectroscopy.

3. The method of claim 1, wherein determining the bond dissociation energy comprises performing spectroscopy, and wherein a contaminant in the material comprises the molecular bond.

4. The method of claim 1, wherein determining the bond dissociation energy comprises performing at least one of: resonance enhanced multi-photon ionization (REMPI) spectroscopy; resonance ionization spectroscopy (RIS); photofragment imaging; product imaging; velocity map imaging; three-dimensional ion imaging; centroiding; zero electron kinetic imaging (ZEKE); mass enhanced threshold ionization (MATI); and photo-induced Ryberg ionization (PIRI).

5. The method of claim 1, wherein dissociating the molecular bond by irradiating the flow of material with light of the selected light frequency comprises dissociating the molecular bond via multi-photon ionization.

6. The method of claim 1, wherein the light source comprises a tunable laser, and
   wherein the system that comprises software comprises a sensor driven action response software system.

7. A system comprising:
   an enclosure that encloses a treatment region and that comprises a first port that is operative to inflow material into the enclosure and a second port that is operative to outflow the material from the enclosure so that at least a portion of the material flows through the treatment region;
   a sensor that is operative to determine dissociation energies of molecular bonds, the sensor disposed outside the treatment region to sense the material to determine a dissociation energy of at least one molecular bond of the material; and
   a light source that is oriented with respect to the treatment region to irradiate the material with light that provides the dissociation energy, as determined by the sensor, to dissociate the at least one molecular bond.

8. The system of claim 7, wherein the disposed sensor is configured to determine a second dissociation energy of at least one second molecular bond of the material, and
   wherein the light source is tunable across a range of light frequencies including:
      a first light frequency for the light that provides the dissociation energy to dissociate the at least one molecular bond of the material; and
      a second light frequency for second light that provides the second dissociation energy of the at least one second molecular bond of the material.

9. The system of claim 8, further comprising software that, when executed, drives the light source based on input from the sensor.

10. The system of claim 9, wherein the software is non-transitory.

11. The system of claim 9, wherein driving the light source comprises causing the light source to perform multi-photon ionization.

12. A system comprising:
   a chamber that comprises: an inlet; an outlet; and a treatment region, wherein the chamber is configured so that material transports into and out of the treatment region as the material flows between the inlet and the outlet;
   a sensor that is disposed before the treatment region to sense a flow of the material and that is operative to determine a frequency for dissociating a target bond of the material; and
   a light source that is tunable for supplying light of the frequency determined by the sensor, that is operably coupled to the sensor, and that is disposed to emit said light into the treatment region to irradiate the material.

13. The system of claim 12, wherein the sensor comprises a Raman spectrograph.

14. The system of claim 12, wherein the sensor is operative to perform Raman spectroscopy.

15. The system of claim 12, wherein the sensor comprises a spectroscopy device.

16. The system of claim 12, wherein the sensor is operative to determine the frequency for dissociating the target bond based on at least one of: resonance enhanced multi-photon ionization (REMPI) spectroscopy; resonance ionization spectroscopy (RIS); photofragment imaging; product imaging; velocity map imaging; three-dimensional ion imaging; centroiding; zero electron kinetic imaging (ZEKE); mass enhanced threshold ionization (MATI); and photo-induced Ryberg ionization (PIRI).

17. The system of claim 12, wherein the light source comprises a tunable laser and an optical fiber, the optical fiber extending into the treatment region and comprising a photocatalyst disposed for excitation by said light.

18. The system of claim 12, wherein the system further comprises a sensor driven action response software system operably coupled to the sensor and the light source.

19. The system of claim 12, wherein the sensor is further operable to determine multi-photon dissociation energies of target bonds.

20. The system of claim 19, wherein the light source comprises a tunable laser that is configured to perform multi-photon ionization of the target bonds based on the determined multi-photon dissociation energies, and
   wherein the system further comprises software that is configured to tune the tunable laser based on input from the sensor.

* * * * *